US008017699B1

(12) United States Patent
Sanner et al.

(10) Patent No.: US 8,017,699 B1
(45) Date of Patent: Sep. 13, 2011

(54) POLYIMIDE POLYPHENYLSULFONE BLENDS WITH IMPROVED FLAME RESISTANCE

(75) Inventors: Mark Sanner, Newburgh, IN (US); Robert Russell Gallucci, Mt. Vernon, IN (US); Rajendra K. Singh, Lompoc, CA (US)

(73) Assignee: SABIC Innovative Plastics IP B.V., Bergen OP Zoom (NL)

( * ) Notice: Subject to any disclaimer, the term of this patent is extended or adjusted under 35 U.S.C. 154(b) by 0 days.

(21) Appl. No.: 12/908,700

(22) Filed: Oct. 20, 2010

(51) Int. Cl.
*C08F 283/04* (2006.01)
*C08F 283/12* (2006.01)
*C08L 81/06* (2006.01)

(52) U.S. Cl. ........ 525/422; 525/474; 525/535; 525/537; 524/588; 524/606; 524/609

(58) Field of Classification Search .................. 525/422, 525/474, 535, 537; 524/588, 606, 609
See application file for complete search history.

(56) References Cited

U.S. PATENT DOCUMENTS 6,103,810 A * 8/2000 Frayer et al. .................. 524/494

* cited by examiner

*Primary Examiner* — Peter Szekely
(74) *Attorney, Agent, or Firm* — Novak Druce & Quigg LLP

(57) ABSTRACT

The present disclosure relates to a composition with improved flame resistance, to articles made from the composition, and to methods that include processing the composition. The composition can include from 15 to 85 percent by weight of a polyetherimide (PEI), from 15 to 85 percent by weight of a polyphenylsulfone (PPSU), a polyetherimide-siloxane copolymer in an amount up to 12 percent by weight, and from 0 to 0.30 percent by weight of a stabilizer.

37 Claims, No Drawings

POLYIMIDE POLYPHENYLSULFONE BLENDS WITH IMPROVED FLAME RESISTANCE

FIELD

The invention relates to compositions including polyimide polyphenylsulfone blends, and more particularly to polyimide polyphenylsulfone blends having improved flame resistance and other desirable properties; articles made from the compositions; and methods of shaping the compositions.

BACKGROUND

There has long been interest in developing thermoplastic resins that can resist burning. A specific area of concern is in developing plastics for transportation applications, such as rail cars and airplanes. Various evaluation techniques have been developed to test the effectiveness of such thermoplastic materials, for instance Federal Aviation Regulation (FAR) 25.853. In this test, sometimes referred to as the Ohio State University (OSU) rating, the amount of energy released after 2 minutes and the peak heat release energy are measured. Lower heat release values are desirable.

For many aerospace and transportation applications, materials are required to have a rating of 65/65 (2 minute heat release/peak heat release) or less to be compliant with the standard. In several applications, a rating of 55/55 or less is required with 40/40 being a preferred rating with standards expected to become more stringent in the near future. In general, it is highly desirable to have a material demonstrate a resistance to burn and achieve low OSU ratings. In addition, the time it takes to obtain peak heat release is another material characteristic that has significance since it correlates to the time people, such as passengers, crew, and others, have to flee the hazardous conditions.

SUMMARY

The addition of a polyimide-siloxane copolymer to polyetherimide (PEI) and polyphenylsulfone (PPSU) blends has been found to significantly improve flame performance as measured by OSU (FAR/JAR 25.853 Amendment 25-83 Part IV) test protocol. A material blend composition has been developed resulting in not only an OSU performance level of 0/7, but also a peak heat release time of 287 seconds, which is a significant improvement in flame resistance over known materials. In addition, various resin blends of PEI/PPSU with siloxane polyimide were found to be in compliance for FAR vertical burn and NBS Smoke & toxicity tests.

Embodiments of the invention relate to a composition, to articles made from the composition, and to methods that include processing the composition. The composition can exhibit one or more of the following properties: a time to peak heat release of more than 150 seconds, as measured by FAR 25.853 (OSU test); a peak heat release less than or equal to 35 kW/m2 as measured by FAR 25.853 (OSU test); an NBS (National Bureau of Standards) optical smoke density w/flame of less than 5 when measured at four (4) minutes, based on ASTM E-662 (FAR/JAR 25.853); and a toxic gas release of less than or equal to 100 ppm based on Draeger Tube Toxicity test (Airbus ABD0031, Boeing BSS 7239). The composition can generally include from 15 to 85 percent by weight of a polyetherimide (PEI), from 15 to 85 percent by weight of a polyphenylsulfone (PPSU), a polyetherimide-siloxane copolymer in an amount up to 12 percent by weight, and from 0 to 0.30 percent by weight of a stabilizer.

These and other features, aspects, and advantages will become better understood with reference to the following description of the preferred embodiments and appended claims.

DETAILED DESCRIPTION

Other than in operating examples or where otherwise indicated, all numbers or expressions referring to quantities of ingredients, reaction conditions, and the like, used in the specification and claims are to be understood as modified in all instances by the term "about." The term "about" generally refers to a range of numbers that one of skill in the art would consider equivalent to the recited value (i.e., having the same function or result). In many instances, the term "about" may include numbers that are rounded to the nearest significant figure.

Various numerical ranges are disclosed in this patent application. Because these ranges are continuous, they include every value between the minimum and maximum values. Unless expressly indicated otherwise, the various numerical ranges specified in this application are approximations. Numerical ranges include all values within the range. For example, a range of from 1 to 10 supports, discloses, and includes the range of from 5.3 to 9.78. Similarly, a range of at least 10 supports, discloses, and includes the range of at least 15.

One embodiment relates to a composition exhibiting one or more of the following properties: a time to peak heat release of more than 150 seconds, as measured by FAR 25.853 (OSU test); a peak heat release less than or equal to 35 kW/m2 as measured by FAR 25.853 (OSU test); an NBS (National Bureau of Standards) optical smoke density w/flame of less than 5 when measured at four (4) minutes, based on ASTM E-662 (FAR/JAR 25.853); and a toxic gas release of less than or equal to 100 ppm based on Draeger Tube Toxicity test (Airbus ABD0031, Boeing BSS 7239). The composition can include from 15 to 85 percent by weight of a polyetherimide (PEI), from 15 to 85 percent by weight of a polyphenylsulfone (PPSU), a polyetherimide-siloxane copolymer in an amount up to 12 percent by weight, and from 0 to 0.30 percent by weight of a stabilizer.

The term "polyetherimide" refers to a polymer containing monomer units which comprise both ether and an imide group. An ether group is well known in the art and consists of an oxygen atom single bonded to two different carbon atoms. An imide group is a nitrogen containing acid having two double bonds.

The polyetherimide can have less than 20 ppm hydroxyl (—OH) end-groups. The polyetherimide can have a weight average molecular weight (Mw) of 20,000 to 80,000 daltons. The polyetherimide can have a halogen content of less than 1000 ppm, and wherein the polyetherimide has less than 100 ppm benzylic protons. The polyetherimide can have less than or equal to 500 ppm of low molecular weight bis-imide compounds selected from the group consisting of: meta-phenylene diamine bis-phthalimide, meta-phenylene diamine bis-chloro phthalimides, para-phenylene diamine bis-phthalimide, para-phenylene bis-chloro phthalimides, and combinations thereof.

The polyphenylsulfone can be a copolymer comprising: from 50 to 99.9 percent by weight of a polyphenylsulfone (PPSU), and from 0.1% to 50 percent by weight of a polysulfone (PSU). The polyphenylsulfone can be a copolymer comprising: 80 percent by weight of a polyphenylsulfone (PPSU), and 20 percent by weight of a polysulfone (PSU). The polyphenylsulfone can have a glass transition temperature (Tg) greater than 200 degrees Celsius. The polyphenylsulfone can have a weight average molecular weight (Mw) of 20,000 to 80,000. The polyphenylsulfone can have hydroxyl (—OH) end-groups less than 50 ppm. The polyphenylsulfone can have low oligomer cyclics (n=2,3,4) of less than 5%.

The composition can include a silicone copolymer in an amount up to 12 percent by weight, from 1 to 8 percent by weight, or about 4 percent by weight. Various types of silicone copolymer can be employed. The silicone copolymer can be selected from resorcinol-based aryl polyester carbonate siloxanes, polyimide siloxanes, polyetherimide siloxanes, polyetherimide sulfone siloxanes, polycarbonate siloxanes, polyestercarbonate siloxanes, polysulfone siloxanes, polyether sulfone siloxanes, polyphenylene ether sulfone siloxanes and mixtures thereof.

In some embodiments, the silicone copolymer can be a polyetherimide-siloxane copolymer. The polyetherimide-siloxane copolymer can be a polyetherimide-siloxane random copolymer with from 10 to 50 percent by weight siloxane. The polyetherimide-siloxane copolymer can be a polyetherimide-siloxane random copolymer with 10-35 percent by weight siloxane. The polyetherimide-siloxane copolymer can be a polyetherimide-siloxane block copolymer with 15-30% dimethyl siloxane with a block length from 10 to 40 dimethyl siloxane units.

The block length of a siloxane segment of the silicone copolymer may be of any effective length. In some examples it may be of 2-50 siloxane repeating units. In other instances the siloxane block length it may be from 5-30 repeat units. In many instances dimethyl siloxanes may be used.

Siloxane polyetherimide copolymers are a specific embodiment of the siloxane copolymer that may be used in the blends of this invention. Examples of such siloxane polyetherimides are shown in U.S. Pat. Nos. 4,404,350, 4,808,686 and 4,690,997. In one instance polyetherimide siloxanes can be prepared in a manner similar to that used for polyetherimides, except that a portion, or all, of the organic diamine reactant is replaced by an amine-terminated organo siloxane, for example of the formula I wherein g is an integer from 1 to about 50, preferably from about 5 to about 30 and R' is an aryl, alkyl or aryl alky group of from 2 to 20 carbon atoms.

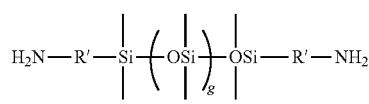

Formula I

The polyimide siloxane can be prepared by any of the methods well known to those skilled in the art, including the reaction of an aromatic bis(ether anhydride) of the formula (II)

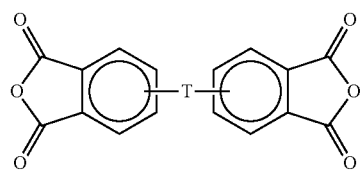

Formula II wherein T is —O—, —S—, —SO$_2$— or a group of the formula —O—Z—O— wherein the divalent bonds of the —O— or the —O—Z—O— group are in the 3,3', 3,4', 4,3', or the 4,4' positions, and wherein Z includes, but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (III)

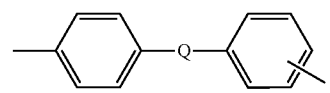

Formula III wherein Q includes but is not limited to a divalent moiety selected from the group consisting of —O—, —S—, —C(O)—, —SO$_2$—, —SO—, —C$_y$H$_{2y}$— (y being an integer from 1 to 8), and fluorinated derivatives thereof, including perfluoroalkylene groups, with an organic diamine of the formula (IV)

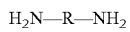 H$_2$N—R—NH$_2$            Formula IV wherein the moiety R in formula (IV) includes, but is not limited to, substituted or unsubstituted divalent organic radicals such as: (a) aromatic hydrocarbon radicals having about 6 to about 24 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (III).

Examples of specific aromatic bis anhydrides and organic diamines are disclosed, for example, in U.S. Pat. Nos. 3,972,902 and 4,455,410. Illustrative examples of aromatic bis anhydride of formula (II) include: 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

Examples of suitable compounds are ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl) propane, 2,4-bis(amino-t-butyl) toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl) sulfide, bis(4-aminophenyl) sulfone, bis(4-aminophenyl)ether and 1,3-bis(3-aminopropyl) tetramethyldisiloxane. Mixtures of these compounds may also be present. The preferred diamino compounds are aromatic diamines, especially m- and p-phenylenediamine, sulfonyl dianiline and mixtures thereof.

Some polyetherimde siloxanes may be formed by reaction of an organic diamine, or mixture of diamines, of formula IV and the amine-terminated organo siloxane of I. The diamino components may be physically mixed prior to reaction with the bis-anhydride(s), thus forming a substantially random copolymer. Alternatively block or alternating copolymers may be formed by selective reaction of IV and I with dianhydrides, for example those of formula II, to make polyimide blocks that are subsequently reacted together. In another instance the siloxane used to prepare the polyetherimde copolymer may have anhydride rather than amine functional end groups.

In one instance the siloxane polyetherimide copolymer can be of formula V wherein T, R' and g are described as above, n is from 5-100 and Ar is an aryl or alkyl aryl group of from 6 to 36 carbons.

rus containing stabilizers including triaryl phosphite and aryl phosphonates are of note as useful additives. Difunctional phosphorus containing compounds can also be employed. Stabilizers with a molecular weight of greater than or equal to about 300 are preferred. In other instances phosphorus containing stabilizers with a molecular weight of greater than or equal to 500 are useful. Stabilizers with low volatility are needed so that they are retained in the polymer after melting and shaping at the high temperatures (320-380 C) needed for these compositions. The stabilizer can be a tri-aryl phosphate.

The blends may further contain fillers and reinforcements for example fiber glass, milled glass, glass beads, flake and the like. Minerals such as talc, wollastonite, mica, kaolin or montmorillonite clay, silica, quartz and barite may be added. The compositions can also be modified with effective amounts of inorganic fillers, such as, for example, carbon fibers and nanotubes, metal fibers, metal powders, conductive carbon, and other additives including nano-scale reinforcements.

The composition can have a melt stability viscosity ratio at 340 degrees Celsius and 10 secs$^{-1}$ of less than 1, wherein the melt stability viscosity ratio is measured by parallel plate rheometry, and wherein the melt stability viscosity ratio is the ratio of the melt viscosity after 30 minutes at a temperature to the melt viscosity after 10 minutes at the temperature. The composition can be melt processable, such that the composition can be processed by a method selected from the group consisting of injection molding, blow molding, compression molding, profile extrusion, sheet or film extrusion, gas assist molding, structural foam molding, thermoforming, and combinations thereof. The composition can demonstrate shear thinning behavior with a ratio of viscosity at 100 sec$^{-1}$ and Formula V

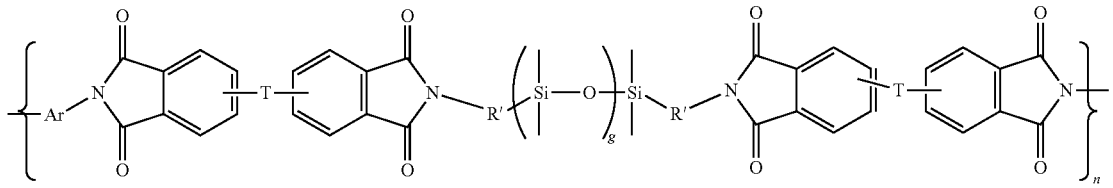

In some siloxane polyetherimides the diamine component of the siloxane polyetherimide copolymers may contain from about 20 to 50 mole % of the amine-terminated organo siloxane of formula I and from about 50 to 80 mole % of the organic diamine of formula IV. In some siloxane copolymers, the siloxane component is derived from about 25 to about 40 mole % of an amine or anhydride terminated organo siloxane, for example as described in U.S. Pat. No. 4,404,350.

For purposes of this specification the terms "resorcinol-based aryl polyesters" and "resorcinol-based polyaryl esters" and "resorcinol-based polyarylate" shall all mean a copolymer comprising resorcinol moieties and resorcinol-based ester linkages and possibly other linkages also such as resorcinol-based polycarbonate linkages. These terms are meant to include both polyesters only containing ester bonds and polyester carbonates in instances where resorcinol-based polycarbonate linkages are present. Such resorcinol based polyaryl esters are described in U.S. Pat. Nos. 7,452,944 and 7,652,107.

The stabilizer can be present in an amount of from 0.05 to 0.30 percent by weight. Stabilizers include, antioxidants such as phosphites, phosphonites and hindered phenols. Phospho- 5,000 sec$^{-1}$ of less than 10 at 340 degrees Celsius as measured by capillary rheometry. The composition can include less than 1500 ppm halogen based on the total weight of the polyetherimide and the polyphenylsulfone. The composition can include less than 100 ppm alkali metals based on the total weight of the polyetherimide and the polyphenylsulfone.

A second embodiment of the invention relates to articles made from the composition. The articles can exhibit one or more of the following properties: a time to peak heat release of more than 150 seconds, as measured by FAR 25.853 (OSU test); a peak heat release less than or equal to 35 kW/m$^2$ as measured by FAR 25.853 (OSU test); an NBS (National Bureau of Standards) optical smoke density w/flame of less than 5 when measured at four minutes, based on ASTM E-662 (FAR/JAR 25.853); and a toxic gas release of less than or equal to 100 ppm based on Draeger Tube Toxicity test (Airbus ABD0031, Boeing BSS 7239). The toxic gas can be selected from the group of HCN, CO, NO, NO$_2$, SO$_2$, H$_2$S, HF, HCl, and combinations thereof.

The articles can include a composition that includes from 15 to 85 percent by weight of a polyetherimide (PEI), from 15 to 85 percent by weight of a polyphenylsulfone (PPSU), a siloxane copolymer in an amount up to 12 percent by weight, and from 0 to 0.30 percent by weight of a stabilizer. The article can be a shaped article. The article can be a molded article. The article can be at least one selected from the group consisting of: cookware, food service items, medical devices, trays, plates, handles, helmets, animal cages, electrical connectors, enclosures for electrical equipment, engine parts, automotive engine parts, lighting sockets, lighting reflectors, electric motor parts, power distribution equipment, communication equipment, computers, devices having molded snap fit connectors, sheets, films, multilayer sheets, multilayer films, molded parts, extruded profiles, coated parts, fibers, foams, windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment, and instrument panels. The article can be a component of a conveyance selected from the group consisting of aircraft, trains, buses, ships, and automobiles. The article can have a percent transmittance of greater than 50 percent. The article can have a percent haze below 25 percent.

Compositions discussed herein may be converted to articles using common thermoplastic processes such as film and sheet extrusion, Film and sheet extrusion processes may include and are not limited to melt casting, blown film extrusion and calendering. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow coating. Film and sheet may alternatively be prepared by casting a solution or suspension of the composition in a suitable solvent onto a substrate, belt or roll followed by removal of the solvent. Films may also be metallized using standard processes such as sputtering, vacuum deposition and lamination with foil.

Oriented films may be prepared through blown film extrusion or by stretching cast or calendered films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

Compositions discussed herein may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1) Providing a single or multi-layer thermoplastic substrate having optionally one or more colors on the surface, for instance, using screen printing of a transfer dye.
2) Conforming the substrate to a mold configuration such as by forming and trimming a substrate into a three dimensional shape and fitting the substrate into a mold having a surface which matches the three dimensional shape of the substrate.
3) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

A third embodiment relates to a method comprising melt processing a composition that exhibits one or more of the following properties: a time to peak heat release of more than 150 seconds, as measured by FAR 25.853 (OSU test); a peak heat release less than or equal to 35 kW/m2 as measured by FAR 25.853 (OSU test); an NBS (National Bureau of Standards) optical smoke density w/flame of less than 5 when measured at four (4) minutes, based on ASTM E-662 (FAR/JAR 25.853); and a toxic gas release of less than or equal to 100 ppm based on Draeger Tube Toxicity test (Airbus ABD0031, Boeing BSS 7239). The composition can include from 15 to 85 percent by weight of a polyetherimide (PEI), from 15 to 85 percent by weight of a polyphenylsulfone (PPSU), a siloxane copolymer in an amount up to 12 percent by weight, and from 0 to 0.30 percent by weight of a stabilizer. The method can include forming a shaped product comprising the composition. The method can include one selected from the group consisting of injection molding, blow molding, compression molding, profile extrusion, sheet or film extrusion, gas assist molding, structural foam molding, thermoforming, and combinations thereof.

The above disclosure provides examples and aspects relating to various embodiments within the scope of claims, appended hereto or later added in accordance with applicable law. However, these and the following examples are not limiting as to how any disclosed aspect may be implemented, as those of ordinary skill can apply these disclosures to particular situations in a variety of ways.

EXAMPLES

Although the present invention has been described in considerable detail with reference to certain preferred versions thereof, other versions are possible. Therefore, the spirit and scope of the appended claims should not be limited to the description of the preferred versions contained herein.

Table 1 summarizes various raw materials used in the examples. Table 1 also provides an exemplary, non-limiting range of weight percentages at which each material can be employed.

TABLE 1

| Materials | Trade Name | Supplier | Form | Weight (%) |
|---|---|---|---|---|
| Polyetherimide (PEI) | Ultem 1000 (C1140) | SABIC Innovative Plastics | Fines | 0-99.9 |
| Polyphenylsulfone (PPSU) | Radel R-5100NT | Solvay Advanced Polymers | Pellets | 0-99.9 |
| Polysulfone (PSU) | Udel 1700P | Solvay Advanced Polymers | Pellets | 0-76.7 |
| polyetherimide-siloxane random copolymer with 34% Siloxane | Siltem D9000 (C1180) | SABIC Innovative Plastics | Fines | 0-8.0 |
| polyetherimide-siloxane block copolymer with 20% Siloxane | Siltem (STM1700) | SABIC Innovative Plastics | Pellets | 0-6.8 |
| PPSU/PSU 80:20 | n/a | SABIC | Pellets | 0-38.4 |

TABLE 1-continued

| Materials | Trade Name | Supplier | Form | Weight (%) |
|---|---|---|---|---|
| Copolymer | | Innovative Plastics | | |
| Resorcinol-polyester carbonate with 1% Siloxane | Lexan FST | SABIC Innovative Plastics | Fines | 0-20.0 |
| Tri-aryl phosphite Stabilizer | Alkanox 240 | Chemtura | Fines | 0-0.1 |

Tables 2A-2G summarize results obtained by introducing various amounts of Siltem D9000 (a random block copolymer) to blends comprising polyetherimide (PEI) and Polyphenylsulfone (PPSU), having a PEI:PPSU weight ratio of about 60:40.

TABLE 2A

| Formulation | Units | A1 | A2 | A3 | A4 (I) | A5 (I) | A6 (I) | A7 (I) | A8 (I) |
|---|---|---|---|---|---|---|---|---|---|
| Ultem 1000 | wt % | 99.9 | | 59.9 | 59.3 | 58.7 | 57.5 | 55.1 | 57.5 |
| PPSU-Radel R | wt % | | 99.9 | 40.0 | 39.6 | 39.2 | 38.4 | 36.8 | |
| Siltem D9000 | wt % | | | | 1.0 | 2.0 | 4.0 | 8.0 | 4.0 |
| PPSU-PSU Copolymer | wt % | | | | | | | | 38.4 |
| triaryl phosphite Stabilizer | wt % | 0.1 | 0.1 | 0.1 | 0.1 | 0.1 | 0.1 | 0.1 | 0.1 |

TABLE 2B

| MVR Results | Units | A1 | A2 | A3 | A4 (I) | A5 (I) | A6 (I) | A7 (I) | A8 (I) |
|---|---|---|---|---|---|---|---|---|---|
| MVR (337° C./6.7 kgf) | cm$^3$/10 min | 8.1 | 9.3 | 9.3 | 9.4 | 9.8 | 10.5 | 10.7 | 9.8 |

TABLE 2C

| FAA OSU | Units | A1 | A2 | A3 | A4 (I) | A5 (I) | A6 (I) | A7 (I) | A8 (I) |
|---|---|---|---|---|---|---|---|---|---|
| 2 min Heat Release | kW-min/m$^2$ | 15 | 10 | 16 | 7 | 1 | 0 | 1 | 0 |
| Peak Heat Release | kW/m$^2$ | 40 | 60 | 46 | 35 | 20 | 19 | 28 | 19 |
| Peak HR Time | secs | 146 | 198 | 261 | 280 | 253 | 187 | 294 | 254 |

TABLE 2D

| FAR Vertical Burn | Units | A1 | A2 | A3 | A4 (I) | A5 (I) | A6 (I) | A7 (I) | A8 (I) |
|---|---|---|---|---|---|---|---|---|---|
| Ignition Flame Out | secs | 1.0 | 1.1 | 1.0 | 1.0 | 1.0 | 1.0 | 1.0 | 1.0 |
| Burn Length | inches | 3.0 | 3.5 | 3.0 | 3.0 | 3.5 | 3.0 | 3.0 | 3.0 |
| Drips/Burn Time | secs | ND | ND | ND | ND | ND | ND | ND | ND |
| FAA Classification | Pass/Fail | Pass | Pass | Pass | Pass | Pass | Pass | Pass | Pass |

TABLE 2E

| NBS Smoke Density | Units | A1 | A2 | A3 | A4 (I) | A5 (I) | A6 (I) | A7 (I) | A8 (I) |
|---|---|---|---|---|---|---|---|---|---|
| Ds @ 1.5 min | Dimensionless | 1 | 0 | 0 | 0 | 0 | 0 | 1 | 0 |
| Ds @ 4.0 min | Dimensionless | 1 | 1 | 1 | 0 | 0 | 0 | 1 | 1 |
| Ds Max (Dm) | Dimensionless | 1 | 1 | 1 | 1 | 0 | 1 | 1 | 1 |

TABLE 2F

| Toxicity (Draeger) | Units | A1 | A2 | A3 | A4 (I) | A5 (I) | A6 (I) | A7 (I) | A8 (I) |
|---|---|---|---|---|---|---|---|---|---|
| HCN | ppm | <1 | <1 | <1 | <1 | <1 | <1 | <1 | <1 |
| CO | ppm | 88 | 88 | 75 | 100 | 100 | 88 | 100 | 100 |
| NO/NO$_2$ | ppm | 3 | 3 | 3 | 5 | 2 | 4 | 4 | 5 |
| SO$_2$/H$_2$S | ppm | <1 | <1 | <1 | <1 | <1 | <1 | | |
| HF | ppm | <1 | <1 | <1 | <1 | <1 | <1 | <1 | |
| HCl | ppm | <1 | <1 | <1 | <1 | <1 | <1 | <1 | |

TABLE 2G

| Melt Stability @ 340 C. | Units | A1 | A2 | A3 | A4 (I) | A5 (I) | A6 (I) | A7 (I) | A8 (I) |
|---|---|---|---|---|---|---|---|---|---|
| Viscosity Ratio @ 30 min/10 min @ 10 1/secs (Parallel Plate Rheometry) | ratio | 1.0 | 1.0 | 1.0 | 0.94 | 0.91 | 0.90 | 0.87 | 0.90 |
| Viscosity Ratio @ | ratio | 7.9 | 5.5 | 7.9 | 8.5 | 8.2 | 8.2 | 8.1 | 8.3 |

TABLE 2G-continued

| Melt Stability @ 340 C. | Units | A1 | A2 | A3 | A4 (I) | A5 (I) | A6 (I) | A7 (I) | A8 (I) |
|---|---|---|---|---|---|---|---|---|---|
| 100 1/secs/ 5000 1/secs (Capillary Rheometry) | | | | | | | | | |

As presented in tables 2A-2G, blends noted as A1-A8 are material compositions consisting of PEI (Ultem), PPSU (Radel R), Siltem D9000 (a random dimethyl silicone block copolymer), and P4 (a BPA-biphenol polysulfone copolymer) with 0.1 weight percent tris di-t-butyl phenyl phosphite stabilizer. Blends A1 and A2 are individual constituents of PEI and PPSU with 0.1 weight percent stabilizer and were extruded and molded to establish baselines for which all subsequent material formulations were compared. Resin blend formulations A3-A7 maintained a PEI to PPSU weight ratio of about 60:40, while increasing Siltem D9000 from 0 to 8 weight percent which corresponds to 0 to 2.7 weight percent siloxane in the blends. In addition, resin blend A8 was prepared by substituting PPSU from blend A6 with a PPSU-PSU copolymer at a PPSU to PSU weight ratio of 80:20, to demonstrate it could achieve the same results as a 100% PPSU homopolymer.

OSU performance of PEI (A1) and PPSU (A2) resulted in ratings (denoted as 2 min. heat release/peak heat release) of 15/40 and 10/60 respectively. A polymer blend (A3), having a PEI to PPSU weight ratio of 60:40, achieved a rating of 16/46, and compared favorably to the individual constituents and was an expected result. The addition of siloxane (A4-A7) as Siltem D9000 into the PEI/PPSU polymer blend significantly improved OSU performance by surprisingly lowering the 2 min. heat release from 16 to 0 kW-min/m$^2$ and the peak heat release from 46 to 19 kW/m$^2$ respectively. These are exceptionally low heat release values that can provide materials that will allow the construction of passenger compartment components that will give longer passenger escape time in a fire. As the siloxane level increased in the blend, OSU performance levels improved until an optimum level was reached with 1.36 weight percent siloxane, which corresponds to 4 weight percent of Siltem D9000 in the blend. Further addition of siloxane to 2.7 weight percent levels with the addition of 8% Siltem D9000 was too high and OSU performance reduced. The use of PPSU-PSU copolymer (A8) in the blend resulted in OSU of 0/19, which was in agreement with a result obtained with PPSU (A6). This demonstrated a PPSU-PSU copolymer, having a PPSU to PSU weight ratio of 80:20, has OSU characteristics similar to 100% PPSU homopolymer.

FAR vertical burn test results for the blends in Table 2 were very good with exceptionally short ignition flame out times ranging from 1.0 to 1.1 seconds and burn lengths of 3.0 to 3.5 inches with no drips. All formulations passed the FAA test and were in compliance.

The NBS smoke density and toxicity results were very low for all formulations and significantly below threshold levels required to be in compliance. Smoke density ranged from 0 to 1 whereas toxicity levels ranged from <1 to 100 ppm with level dependent on chemical constituent liberated during the test.

Tables 3A-2G summarize results obtained by introducing 4 weight percent of a random dimethyl silicone block copolymer, Siltem D9000, to blends comprising various amounts of polyetherimide (PEI) and Polyphenylsulfone (PPSU).

TABLE 3A

| Formulation | Units | A9 | A10 | A11 | A12 (I) | A13 (I) | A14 (I) |
|---|---|---|---|---|---|---|---|
| Ultem 1000 | wt % | 40.0 | 20.0 | 79.9 | 38.4 | 19.2 | 76.7 |
| PPSU-Radel R | wt % | 59.9 | 79.9 | 20.0 | 57.5 | 76.7 | 19.2 |
| Siltem D9000 | wt % | | | | 4.0 | 4.0 | 4.0 |
| Tri Aryl Phosphite-Stabilizer | wt % | 0.1 | 0.1 | 0.1 | 0.1 | 0.1 | 0.1 |

TABLE 3B

| MVR Results | Units | A9 | A10 | A11 | A12 (I) | A13 (I) | A14 (I) |
|---|---|---|---|---|---|---|---|
| MVR (337° C./6.7 kgf) | cm$^3$/10 min | 10.1 | 9.2 | 8.8 | 10.0 | 9.8 | 9.6 |

TABLE 3C

| FAA OSU | Units | A9 | A10 | A11 | A12 (I) | A13 (I) | A14 (I) |
|---|---|---|---|---|---|---|---|
| 2 min Heat Release | KW min/m$^2$ | 13 | 18 | 13 | 1 | 0 | 0 |
| Peak Heat Release | Kw/m$^2$ | 48 | 51 | 39 | 21 | 26 | 27 |
| Peak HR Time | secs | 236 | 132 | 218 | 175 | 169 | 287 |

TABLE 3D

| FAR Vertical Burn | Units | A9 | A10 | A11 | A12 (I) | A13 (I) | A14 (I) |
|---|---|---|---|---|---|---|---|
| Ignition Flame Out | secs | 1.0 | 1.0 | 1.3 | 1.0 | 1.0 | 1.0 |
| Burn Length | inches | 3.0 | 3.5 | 3.5 | 3.0 | 2.5 | 2.5 |
| Drips/Burn Time | secs | ND | ND | ND | ND | ND | ND |
| FAA Classification | Pass/Fail | Pass | Pass | Pass | Pass | Pass | Pass |

TABLE 3E

| NBS Smoke Density | Units | A9 | A10 | A11 | A12 (I) | A13 (I) | A14 (I) |
|---|---|---|---|---|---|---|---|
| Ds @ 1.5 min | | 1 | 1 | 0 | 0 | 0 | 0 |
| Ds @ 4.0 min | | 2 | 3 | 1 | 1 | 1 | 1 |
| Ds Max (Dm) | | 2 | 3 | 1 | 1 | 1 | 1 |

TABLE 3F

| Toxicity (Draeger) | Units | A9 | A10 | A11 | A12 (I) | A13 (I) | A14 (I) |
|---|---|---|---|---|---|---|---|
| HCN | ppm | <1 | <1 | <1 | <1 | <1 | <1 |
| CO | ppm | 75 | 88 | 100 | 88 | 75 | 88 |
| NO/NO$_2$ | ppm | 3 | 5 | 5 | 3 | 4 | 4 |
| SO$_2$/H$_2$S | ppm | <1 | <1 | <1 | <1 | <1 | <1 |
| HF | ppm | <1 | <1 | <1 | <1 | <1 | <1 |
| HCl | ppm | <1 | <1 | <1 | <1 | <1 | <1 |

TABLE 3G

| Melt Stability @ 340 C. | Units | A9 | A10 | A11 | A12 (I) | A13 (I) | A14 (I) |
|---|---|---|---|---|---|---|---|
| Viscosity Ratio @ 30 min/10 min @ 10 1/secs (Parallel Plate Rheometry) | ratio | 1.0 | 1.0 | 1.0 | 0.88 | 0.86 | 0.88 |
| Viscosity Ratio @ 100 1/secs/5000 1/secs (Capillary Rheometry) | ratio | 6.4 | 6.1 | 7.1 | 8.4 | 8.3 | 8.4 |

As presented in Tables 3A-3G, the OSU performance of PEI/PPSU blends with compositions ranging from 0-100% of each constituent and in 20% increments were evaluated with and without 1.36 weight percent siloxane which was introduced into the blend by adding 4 weight percent Siltem D9000. PEI (A1) and PPSU (A2) constituents resulted in OSU performance of 15/40 and 10/60 whereas experimental blends resulted in 13/39 (A11), 16/46 (A3), 13/48 (A9), 18/51 (A10) for blends having PEI to PPSU weight ratios of 80:20, 60:40, 40:60 and 20:80 respectively. As PPSU was added to the blend in increasing amounts OSU performance of the blend reduced and approached performance levels of 100% PPSU. As only 1.36 weight percent siloxane was added to the blends, OSU was significantly improved and resulted in 0/7 (A14), 0/19(A6), 1/21(A12), and 0/26(A13) for blends with ratio 80:20, 60:40, 40:60 and 20:80 PEI/PPSU respectively. All the PEI/PPSU blends evaluated with siloxane added were substantially lower than the 65/65 compliance requirement and significantly below the desired 40/40 rating levels desired by the transportation and aerospace industries.

FAR vertical burn test results in Table 3D were very good, similar to results reported in Table 2D with ignition flame out times ranging from 1.0 to 1.1 secs and burn lengths of 2.5 to 3.5 inches with no drips. All formulations passed the FAA test and were in compliance.

NBS smoke density and toxicity results were very low for all formulations, as shown in Tables 3E and 3F, and were significantly below thresholds required to be in compliance. Smoke density ranged from 0 to 3 whereas toxicity levels ranged from <1 to 100 ppm with level dependent on chemical constituent liberated during the test.

Tables 4A-4F show results obtained by introducing either Siltem D9000 or a polyetherimide-siloxane block copolymer with 20% siloxane (STM 1700) to blends comprising various amounts of polyetherimide (PEI) and Polyphenylsulfone (PPSU).

TABLE 4A

| Formulation | Units | A3 | A6 (I) | A15 (I) |
|---|---|---|---|---|
| Ultem 1000 | wt % | 59.9 | 57.5 | 55.9 |
| PPSU-Radel R | wt % | 40.0 | 38.4 | 37.2 |
| Siltem D9000 | wt % | | 4.0 | |
| Siltem STM1700 | wt % | | | 6.8 |
| -Tri Aryl Phosphite Stabilizer | wt % | 0.1 | 0.1 | 0.1 |
| Ratio PEI:PPSU | ratio | 60:40 | 60:40 | 60:40 |

TABLE 4B

| MVR Results | Units | A3 | A6 (I) | A15 (I) |
|---|---|---|---|---|
| MVR (337C/6.7 kgf) | $cm^3$/10 min | 9.3 | 10.5 | 10.1 |

TABLE 4C

| FAA OSU | Units | A3 | A6 (I) | A15 (I) |
|---|---|---|---|---|
| 2 min Heat Release | KW min/$m^2$ | 16 | 0 | 0 |
| Peak Heat Release | kW/$m^2$ | 46 | 19 | 20 |
| Peak HR Time | secs | 261 | 187 | 221 |

TABLE 4D

| FAR Vertical Burn | Units | A3 | A6 (I) | A15 (I) |
|---|---|---|---|---|
| Ignition Flame Out | secs | 1.0 | 1.0 | 1.0 |
| Burn Length | inches | 3.0 | 3.0 | 3.0 |
| Drips/Burn Time | secs | ND | ND | ND |
| FAA Classification | Pass/Fail | Pass | Pass | Pass |

TABLE 4E

| NBS Smoke Density | Units | A3 | A6 (I) | A15 (I) |
|---|---|---|---|---|
| Ds @ 1.5 min | | 0 | 0 | 0 |
| Ds @ 4.0 min | | 1 | 0 | 0 |
| Ds Max (Dm) | | 1 | 1 | 0 |

TABLE 4F

| Toxicity (Draeger) | Units | A3 | A6 (I) | A15 (I) |
|---|---|---|---|---|
| HCN | ppm | <1 | <1 | <1 |
| CO | ppm | 75 | 88 | 100 |
| $NO/NO_2$ | ppm | 3 | 4 | 5 |
| $SO_2/H_2S$ | ppm | <1 | <1 | <1 |
| HF | ppm | <1 | <1 | <1 |
| HCl | ppm | <1 | <1 | <1 |

As shown in tables 4A-4F, block copolymer STM 1700 with 20% siloxane was used at 6.8 weight percent in blend A15 to maintain siloxane content equivalent to blend A6 at 1.36 weight percent. Random copolymer, Siltem D9000 with 34% siloxane was added to blend A6 for which blend A15 was compared. Blend A3, described above, is represented in Tables 4A-4F for reference. As described above, blend A3 was a 60:40 weight percent PEI/PPSU blend with no siloxane added.

OSU performance of 0/19 (A6) and 0/20 (A15) were achieved with a PEI/PPSU blend, having a PEI to PPSU weight ratio of 60:40, independent as to whether the siloxane was introduced as a polyetherimide-siloxane random or block copolymer at 1.36 weight percent siloxane.

As shown in Tables 4D, 4E, and 4F, FAR vertical burn, NBS smoke density, and toxicity tests were similar with no significant differences between the blends using random or block polyetherimide-siloxane copolymer. The performance levels are well below the required threshold limits and in compliance.

Tables 5A-4C show results obtained by introducing a resorcinol polyester carbonate siloxane to blends comprising various amounts of polyetherimide (PEI) and Polyphenylsulfone (PPSU).

TABLE 5A

| Formulation | Units | A3 | A16 | A17 (I) | A18 |
|---|---|---|---|---|---|
| Ultem 1000 | wt % | 59.9 | 54.9 | 49.9 | 39.9 |
| PPSU-Radel R | wt % | 40.0 | 40.0 | 40.0 | 40.0 |
| Resorcinol PC Siloxane | wt % | 0 | 5.0 | 10.0 | 20.0 |
| -Tri Aryl Phosphite Stabilizer | wt % | 0.1 | 0.1 | 0.1 | 0.1 |

TABLE 5B

| FAA OSU | Units | A3 | A16 | A17 (I) | A18 |
|---|---|---|---|---|---|
| 2-min. Heat Release | KW min/m² | 16 | 21 | 19 | 22 |
| Peak Heat Release | kW/m² | 46 | 50 | 32 | 29 |
| Peak HR Time | secs | 261 | 167 | 178 | 94 |

TABLE 5C

| FAR Vertical Burn | Units | A3 | A16 | A17 (I) | A18 |
|---|---|---|---|---|---|
| Ignition Flame Out | secs | 1.0 | 0.5 | 0.5 | 0.5 |
| Burn Length | inches | 3.0 | 2.8 | 2.5 | 2.6 |
| Drips/Burn Time | secs | ND | ND | ND | ND |
| FAA Classification | Pass/Fail | Pass | Pass | Pass | Pass |

Tables 5A-5C show results obtained upon the addition of resorcinol polyester carbonate siloxane copolymer (FST-PC) to PEI/PPSU blends with OSU and FAR vertical burn test results reported. The addition of 10 weight percent of FST-PC to a PEI/PPSU blend (A17) was required to achieve an OSU rating of 19/32 with time to peak release of 178 seconds. Further addition of FST-PC at levels of 20 weight percent to PEI/PPSU blends (A18) did not further improve OSU results and thus demonstrates there is an optimum level of siloxane level for a PEI/PPSU blend ratio.

Tables 6A-6E present additional experimental results. Resin blend A17 has greater than 100 ppm of Alkali Metals (Na).

TABLE 6A

| Formulation | Units | A15 | A16 | A17 | A18 | A19 |
|---|---|---|---|---|---|---|
| Ultem 1000 | wt % | 52.7 | 50.3 | 57.5 | 19.2 | 57.5 |
| PPSU Radel R | wt % | 35.2 | 33.6 | | | |
| PSU—Udel | wt % | | | | 76.7 | 38.4 |
| Siltem D9000 | wt % | 12.0 | 16.0 | 4.0 | 4.0 | 4.0 |
| -Tri Aryl Phosphite Stabilizer | wt % | 0.1 | 0.1 | 0.1 | 0.1 | 0.1 |

TABLE 6B

| FAA OSU | Units | A15 | A16 | A17 | A18 | A19 |
|---|---|---|---|---|---|---|
| 2 min Heat Release | KW min/m² | 38 | 46 | 18 | 48 | 46 |
| Peak Heat Release | kW/m² | 68 | 72 | 30 | 82 | 48 |
| Peak HR Time | secs | 183 | 166 | 135 | 184 | 136 |

TABLE 6C

| FAR Vertical Burn | Units | A15 | A16 | A17 | A18 | A19 |
|---|---|---|---|---|---|---|
| Ignition Flame Out | secs | 0 | 0 | 0 | 0 | 0 |
| Burn Length | inches | 2.9 | 3.0 | 2.7 | 2.7 | 2.7 |
| Drips/Burn Time | secs | ND | ND | ND | ND | ND |
| FAA Classification | Pass/Fail | Pass | Pass | Pass | Pass | Pass |

TABLE 6D

| NBS Smoke Density | Units | A15 | A16 | A17 | A18 | A19 |
|---|---|---|---|---|---|---|
| Ds @ 1.5 min | | 0 | 1 | 0 | 1 | 0 |
| Ds @ 4.0 min | | 10 | 10 | 2 | 8 | 8 |
| Ds Max (Dm) | | 10 | 10 | 4 | 8 | 8 |

TABLE 6E

| Toxicity (Draeger) | Units | A15 | A16 | A17 | A18 | A19 |
|---|---|---|---|---|---|---|
| HCN | ppm | <1 | <1 | <1 | <1 | <1 |
| CO | ppm | 150 | 200 | 100 | 100 | 100 |
| NO/NO₂ | ppm | 5 | 5 | 4 | 3 | 4 |
| SO₂/H₂S | ppm | <1 | <1 | <1 | <1 | <1 |
| HF | ppm | <1 | <1 | <1 | <1 | <1 |
| HCl | ppm | <1 | <1 | <1 | <1 | <1 |

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A composition having a time to peak heat release of more than 150 seconds, as measured by FAR 25.853 (OSU test); a peak heat release less than or equal to 35 kW/m2 as measured by FAR 25.853 (OSU test); an NBS (National Bureau of Standards) optical smoke density with flame of less than 5 when measured at four (4) minutes, based on ASTM E-662 (FAR/JAR 25.853); and a toxic gas release of less than or equal to 100 ppm based on Draeger Tube Toxicity test (Airbus ABD0031, Boeing BSS 7239); the composition comprising:
   (a) from 15 to 85 percent by weight of a polyetherimide (PEI),
   (b) from 15 to 85 percent by weight of a polyphenylsulfone (PPSU),
   (c) a silicone copolymer is present in an amount up to 12 percent by weight, and
   (d) from 0 to 0.30 percent by weight of a stabilizer, wherein an article made from the composition exhibits the following properties:
(1) a time to peak heat release of more than 150 seconds, as measured by FAR 25.853 (OSU test);
(2) a peak heat release less than or equal to 35 kW/m$^2$ as measured by FAR 25.853 (OSU test);
(3) an NBS (National Bureau of Standards) optical smoke density with flame of less than 5 when measured at four minutes, based on ASTM E-662 (FAR/JAR 25.853); and
(4) a toxic gas release of less than or equal to 100 ppm based on Draeger Tube Toxicity test (Airbus ABD0031, Boeing BSS 7239).

2. The composition of claim 1, wherein component (a) has less than 20 ppm hydroxyl (—OH) end-groups.

3. The composition of claim 1, wherein component (a) has a weight average molecular weight (Mw) of 20,000 to 80,000 daltons.

4. The composition of claim 1, wherein component (a) has a halogen content of less than 1000 ppm, and wherein component (a) has less than 100 ppm benzylic protons.

5. The composition of claim 1, wherein component (a) has less than or equal to 500 ppm of bis-imide compounds selected from the group consisting of: meta-phenylene diamine bis-phthalimide, meta-phenylene diamine bis-chloro phthalimides, para-phenylene diamine bis-phthalimide, para-phenylene bis-chloro phthalimides, and combinations thereof.

6. The composition of claim 1, wherein component (b) is a copolymer comprising:
from 50 to 99.9 percent by weight of a polyphenylsulfone (PPSU), and
from 0.1% to 50 percent by weight of a polysulfone (PSU).

7. The composition of claim 1, wherein component (b) is a copolymer comprising:
80 percent by weight of a polyphenylsulfone (PPSU), and
20 percent by weight of a polysulfone (PSU).

8. The composition of claim 7, wherein component (b) has a glass transition temperature (Tg) greater than 200 degrees Celsius.

9. The composition of claim 7, wherein component (b) has a weight average molecular weight (Mw) of 20,000 to 80,000.

10. The composition of claim 1, wherein component (b) has hydroxyl (—OH) end-groups less than 50 ppm.

11. The composition of claim 1, wherein component (b) has low oligomer cyclics (n=2,3,4) of less than 5 percent.

12. The composition of claim 1 wherein the silicone copolymer is selected from the group consisting of: resorcinol-based aryl polyester carbonate siloxanes, polyimide siloxanes, polyetherimide siloxanes, polyetherimide sulfone siloxanes, polycarbonate siloxanes, polyestercarbonate siloxanes, polysulfone siloxanes, polyether sulfone siloxanes, polyphenylene ether sulfone siloxanes and mixtures thereof.

13. The composition of claim 1, wherein component (c) is a polyetherimide-siloxane random copolymer with from 10 to 50 percent by weight siloxane.

14. The composition of claim 1, wherein component (c) is a polyetherimide-siloxane random copolymer with 10 to 35 percent by weight siloxane.

15. The composition of claim 1, wherein component (c) is a polyetherimide-siloxane block copolymer with 15 to 30 percent dimethyl siloxane with a block length from 10 to 40 dimethyl siloxane units.

16. The composition of claim 1, wherein the composition comprises from 1 to 8 percent by weight of component (c).

17. The composition of claim 1, wherein the composition comprises 4 percent by weight of component (c).

18. The composition of claim 1, wherein component (d) is present in an amount of from 0.05 to 0.30 percent by weight.

19. The composition of claim 1, wherein component (d) is a tri-aryl phosphite.

20. The composition of claim 1, wherein the toxic gas is selected from the group of HCN, CO, NO, $NO_2$, $SO_2$, $H_2S$, HF, HCl, and combinations thereof.

21. The composition of claim 1, having a melt stability viscosity ratio at 340 degrees Celsius and 10 secs$^{-1}$ of less than 1, wherein the melt stability viscosity ratio is measured by parallel plate rheometry, and wherein the melt stability viscosity ratio is the ratio of the melt viscosity after 30 minutes at a temperature to the melt viscosity after 10 minutes at the temperature.

22. The composition of claim 1, wherein the composition is melt processable, such that the composition can be processed by a method selected from the group consisting of injection molding, blow molding, compression molding, profile extrusion, sheet or film extrusion, gas assist molding, structural foam molding, thermoforming, and combinations thereof.

23. The composition of claim 1, wherein the composition demonstrates shear thinning behavior with a ratio of viscosity at 100 sec$^{-1}$ and 5,000 sec$^{-1}$ of less than 10 at 340 degrees Celsius as measured by capillary rheometry.

24. The composition of claim 1, comprising less than 1500 ppm halogen based on the total weight of components (a) and (b).

25. The composition of claim 1, comprising less than 100 ppm alkali metals based on the total weight of components (a) and (b).

26. A method comprising melt processing a composition according to claim 1.

27. The method according to claim 26, wherein the process further comprises forming a shaped product comprising the composition.

28. The method according to claim 26, wherein the process comprises one selected from the group consisting of injection molding, blow molding, compression molding, profile extrusion, sheet or film extrusion, gas assist molding, structural foam molding, thermoforming, and combinations thereof.

29. An article comprising the composition of claim 1.

30. The article of claim 29, wherein the article is a shaped article.

31. The article of claim 29, wherein the article is a molded article.

32. The article of claim 29, wherein the article is at least one selected from the group consisting of: cookware, food service items, medical devices, trays, plates, handles, helmets, animal cages, electrical connectors, enclosures for electrical equipment, engine parts, automotive engine parts, lighting sockets, lighting reflectors, electric motor parts, power distribution equipment, communication equipment, computers, devices having molded snap fit connectors, sheets, films, multilayer sheets, multilayer films, molded parts, extruded profiles, coated parts, fibers, foams, windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment, and instrument panels.

33. The article of claim 29, wherein the article is a component of a conveyance selected from the group consisting of aircraft, trains, buses, ships, and automobiles.

34. The article of claim 29, having a percent transmittance of greater than 50 percent.

35. The article of claim 29, having a percent haze below 25 percent.

36. A composition comprising:
（a) from 15 to 85 percent by weight of a polyetherimide (PEI),
(b) from 15 to 85 percent by weight of a polyphenylsulfone (PPSU),
(c) a polyetherimide-siloxane copolymer in an amount from 1 percent by weight to 12 percent by weight, and
(d) from 0 to 0.30 percent by weight of a stabilizer,
wherein an article made from the composition exhibits the following properties:
(1) a time to peak heat release of more than 150 seconds, as measured by FAR 25.853 (OSU test),
(2) a peak heat release less than or equal to 35 kW/m$^2$ as measured by FAR 25.853 (OSU test),
(3) an NBS (National Bureau of Standards) optical smoke density with flame of less than 5 when measured at four minutes, based on ASTM E-662 (FAR/JAR 25.853), and
(4) a toxic gas release of less than or equal to 100 ppm based on Draeger Tube Toxicity test (Airbus ABD0031, Boeing BSS 7239).

37. A composition comprising:
(a) from 15 to 85 percent by weight of a polyetherimide (PEI), the polyetherimide having less than or equal to 500 ppm of bis-imide compounds selected from the group consisting of: meta-phenylene diamine bis-phthalimide, meta-phenylene diamine bis-chloro phthalimides, para-phenylene diamine bis-phthalimide, para-phenylene bis-chloro phthalimides, and combinations thereof;
(b) from 15 to 85 percent by weight of a polyphenylsulfone (PPSU),
(c) a polyetherimide-siloxane copolymer is present in an amount up to 12 percent by weight, the siloxane copolymer being selected from the group consisting of resorcinol-based aryl polyester carbonate siloxanes, polyimide siloxanes, polyetherimide siloxanes, polyetherimide sulfone siloxanes, polysulfone siloxanes, polyether sulfone siloxanes, polyphenylene ether sulfone siloxanes, polyphenylene ether siloxanes, and combinations thereof; and
(d) from 0 to 0.30 percent by weight of a stabilizer,
wherein an article made from the composition exhibits the following properties:
(1) a time to peak heat release of more than 150 seconds, as measured by FAR 25.853 (OSU test);
(2) a peak heat release less than or equal to 35 kW/m$^2$ as measured by FAR 25.853 (OSU test);
(3) an NBS (National Bureau of Standards) optical smoke density with flame of less than 5 when measured at four minutes, based on ASTM E-662 (FAR/JAR 25.853); and
(4) a toxic gas release of less than or equal to 100 ppm based on Draeger Tube Toxicity test (Airbus ABD0031, Boeing BSS 7239), the toxic gas being selected from the group of HCN, CO, NO, $NO_2$, $SO_2$, $H_2S$, HF, HCl, and combinations thereof.

\* \* \* \* \*